(12) United States Patent
Peng et al.

(10) Patent No.: US 11,209,519 B2
(45) Date of Patent: Dec. 28, 2021

(54) OBJECT DETECTION SENSOR WITH RADOME COVER CONFIGURATION TO REDUCE TRANSMITTER-RECEIVER COUPLINGS

(71) Applicant: Aptiv Technologies Limited, St. Michael (BB)

(72) Inventors: Zhengyu Peng, Westfield, IN (US); James F. Searcy, Westfield, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 339 days.

(21) Appl. No.: 16/369,971

(22) Filed: Mar. 29, 2019

(65) Prior Publication Data
US 2020/0309902 A1    Oct. 1, 2020

(51) Int. Cl.
*G01S 7/28* (2006.01)
*G01S 13/931* (2020.01)
*H01Q 1/42* (2006.01)

(52) U.S. Cl.
CPC .......... *G01S 7/2813* (2013.01); *G01S 13/931* (2013.01); *H01Q 1/421* (2013.01)

(58) Field of Classification Search
CPC ...... H01Q 1/3233; H01Q 1/521; H01Q 1/523; H01Q 1/525; G01S 7/2813; G01S 7/032; G01S 13/931
USPC .................................................. 342/70, 175
See application file for complete search history.

(56) References Cited

U.S. PATENT DOCUMENTS

| 5,191,351 A | * | 3/1993 | Hofer | H01Q 1/36 343/708 |
| 5,568,394 A | * | 10/1996 | Krikorian | G01S 3/043 702/189 |
| 2004/0178943 A1 | * | 9/2004 | Niv | G01S 13/50 342/29 |
| 2012/0105300 A1 | * | 5/2012 | Ando | G01S 7/038 343/872 |
| 2015/0097730 A1 | | 4/2015 | Pontes | |

FOREIGN PATENT DOCUMENTS

| JP | 2010109890 A | * | 5/2010 | ............. H01Q 21/00 |
| WO | 2018/021244 A1 | | 2/2018 | |

OTHER PUBLICATIONS

Extended European Search Report for Application No. EP 20 16 4298.0 dated Jun. 9, 2020.

* cited by examiner

*Primary Examiner* — Erin F Heard
*Assistant Examiner* — Michael W Justice
(74) *Attorney, Agent, or Firm* — Carlson, Gaskey & Olds

(57) ABSTRACT

An illustrative example sensor device includes a transmitter and a receiver having at least one lobe and at least null. A cover near the transmitter and the receiver includes a surface facing toward the transmitter and the receiver. The surface is at an angle relative to the receiver to direct at least some radiation transmitted by the transmitter and reflected from the surface toward the at least one null of the receiver.

15 Claims, 3 Drawing Sheets

OBJECT DETECTION SENSOR WITH RADOME COVER CONFIGURATION TO REDUCE TRANSMITTER-RECEIVER COUPLINGS

BACKGROUND

Various sensor types have proven useful for detecting objects nearby or in a pathway of a vehicle. Example sensor types include ultrasound, radio and detection ranging (RADAR) and light detection and ranging (LIDAR). Many such sensors include a transmitter and a receiver. A cover typically protects the sensor components. Sometimes the cover is referred to as a radome.

Given the tight packaging constraints on automotive sensors, the radome or cover is typically very close to the transmitter and receiver of the sensor. The radome or cover introduces a near range reflection path from the transmitter to the receiver. Such reflections are received as strong tones close to DC in the sensor. Such near range reflections also contribute to the total noise floor of the sensor.

One approach at dealing with such near range reflections is to use a high-pass filter to remove the tones close to DC. This does not, however, address the increased noise floor, which degrades the signal-to-noise ratio of the receiver. A lower signal-to-noise ratio affects the ability to detect far away objects or objects from which there is a relatively weak reflected signal.

Another proposed approach is to include absorber material between the transmitter and the receiver. This approach, however, introduces additional assembling process steps and increases the cost of the sensor.

SUMMARY

An illustrative example sensor device includes a transmitter and a receiver having at least one lobe and at least null. A cover near the transmitter and the receiver includes a surface facing toward the transmitter and the receiver. The surface is at an angle relative to the receiver to direct at least some radiation transmitted by the transmitter and reflected from the surface toward the at least one null of the receiver.

In an example embodiment having one or more features of the sensor device of the previous paragraph, the angle of the surface directs a majority of the radiation reflected from the surface toward the at least one null.

In an example embodiment having one or more features of the sensor device of any of the previous paragraphs, the angle of the surface directs all of the radiation reflected from the surface toward the at least one null.

In an example embodiment having one or more features of the sensor device of any of the previous paragraphs, the receiver has a field of view, the at least one lobe includes a main lobe near a center of the field of view, the at least one null includes a first null on one side of the main lobe and a second null on another side of the main lobe, there is an angular separation between the first null and the second null, and the angle of the surface has a preselected relationship to the angular separation.

In an example embodiment having one or more features of the sensor device of any of the previous paragraphs, a sum of the angle of the surface plus one-quarter the angular separation equals 90°.

An example embodiment having one or more features of the sensor device of any of the previous paragraphs includes a base. The transmitter is supported on the base, the receiver is supported on the base, and the angle of the surface is an oblique angle relative to the base.

In an example embodiment having one or more features of the sensor device of any of the previous paragraphs, the surface comprises a plurality of surfaces, the angle comprises a plurality of angles, and the surfaces are at respective ones of the angles.

In an example embodiment having one or more features of the sensor device of any of the previous paragraphs, a first one of the angles is a positive angle of a selected magnitude, the angle of a first one of the surfaces is the first one of the angles, a second one of the angles is a negative angle of the selected magnitude, and the angle of a second one of the surfaces is the second one of the angles.

In an example embodiment having one or more features of the sensor device of any of the previous paragraphs, the receiver comprises an antenna and the radiation comprises a radio detection and ranging (RADAR) signal.

In an example embodiment having one or more features of the sensor device of any of the previous paragraphs, the receiver comprises an antenna, the antenna has a receiver pattern including an angular separation between nulls that are respectively on opposite sides of a main lobe, the at least one lobe of the receiver corresponds to the main lobe, the at least one null of the receiver comprises nulls on opposite sides of the at least one lobe of the receiver, the nulls on opposite sides of the at least one lobe of the receiver are separated by the angular separation, and the angle of the surface is based on the angular separation.

An illustrative embodiment of a vehicle includes the sensor of any of the previous paragraphs.

An illustrative example method of controlling transmission and reception coupling in a sensor device includes transmitting radiation from a transmitter of the sensor device, directing at least some of radiation that reflects off a surface of a cover of the sensor device toward at least one null of a receiver of the sensor device based on an angle of the surface relative to the receiver, and attenuating the reflected radiation directed at the at least one null.

In an example embodiment having one or more features of the method of the previous paragraph, the angle of the surface directs a majority of the radiation reflected from the surface toward the at least one null.

In an example embodiment having one or more features of the method of any of the previous paragraphs, the angle of the surface directs all of the radiation reflected from the surface toward the at least one null.

In an example embodiment having one or more features of the method of any of the previous paragraphs, the receiver has a field of view, the at least one lobe includes a main lobe near a center of the field of view, the at least one null includes a first null on side of the main lobe and a second null on another side of the main lobe, there is an angular separation between the first null and the second null, and the angle of the surface has a preselected relationship to the angular separation.

In an example embodiment having one or more features of the method of any of the previous paragraphs, a sum of the angle of the surface plus one-quarter the angular separation equals 90°.

In an example embodiment having one or more features of the method of any of the previous paragraphs, the receiver comprises an antenna and the radiation comprises a radio detection and ranging (RADAR) signal.

An illustrative embodiment of a sensor device includes transmitter means for transmitting radiation; receiver means for receiving radiation, the receiver means having at least one lobe and at least one null; and cover means for covering the transmitter and the receiver, the cover means including a surface facing toward the transmitter and the receiver, the surface being at an angle relative to the receiver to direct at least some radiation transmitted by the transmitter and reflected from the surface toward the at least one null.

In an example embodiment having one or more features of the sensor device of the previous paragraph, the receiver means has a field of view, the at least one lobe includes a main lobe near a center of the field of view, the at least one null includes a first null on side of the main lobe and a second null on another side of the main lobe, there is an angular separation between the first null and the second null, and the angle of the surface has a preselected relationship to the angular separation.

In an example embodiment having one or more features of the sensor device of any of the previous paragraphs, the surface comprises a plurality of surfaces, the angle comprises a plurality of angles, and surfaces are at respective ones of the angles.

The various features and advantages of at least one disclosed example embodiment will become apparent to those skilled in the art from the following detailed description. The drawings that accompany the detailed description can be briefly described as follows.

DETAILED DESCRIPTION

Figure 1:
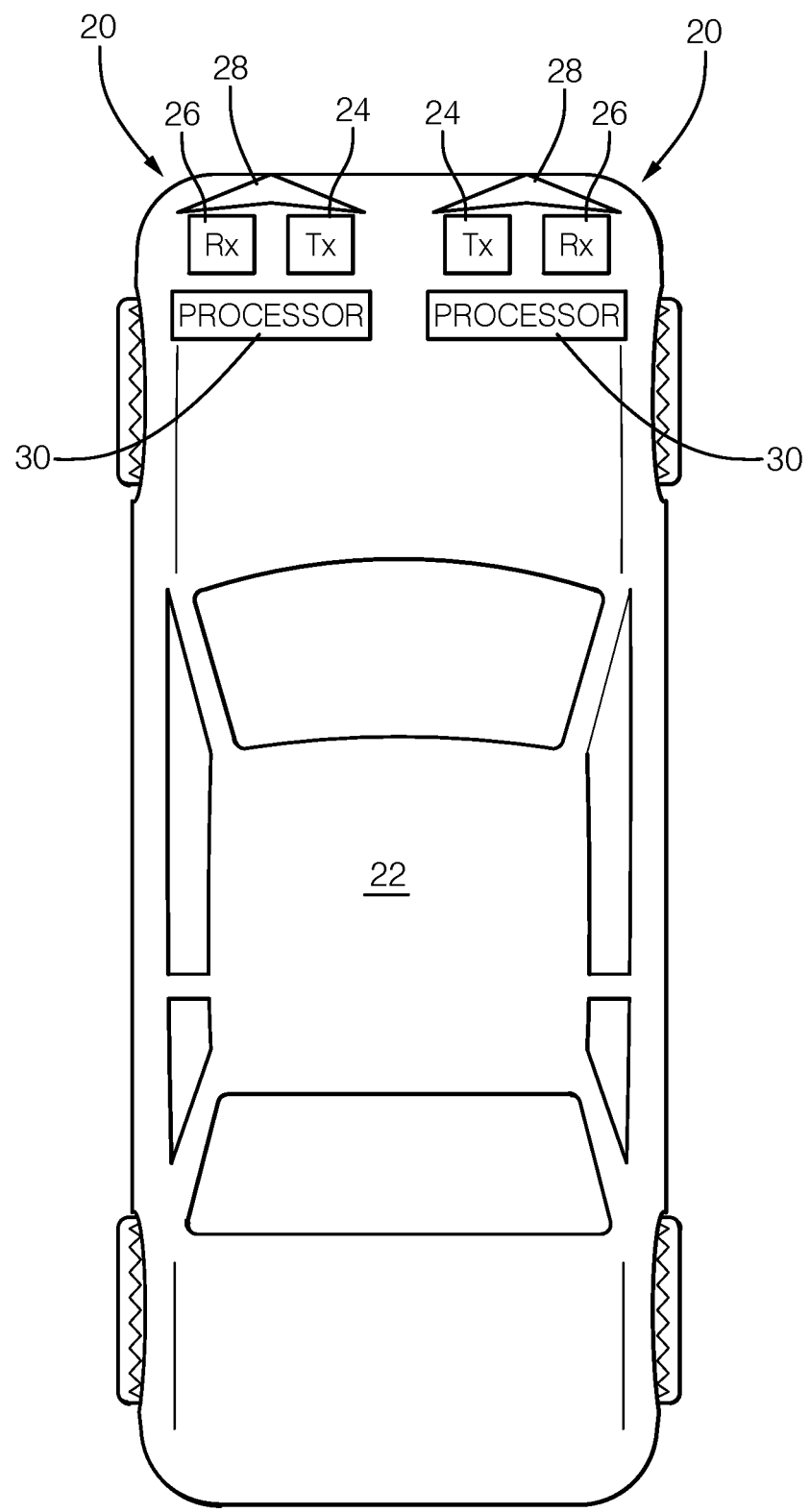
FIG. 1 schematically illustrates a vehicle including sensors designed according to an embodiment of this invention.

FIG. 1 schematically illustrates sensors 20 supported on a vehicle 22. Sensors 20 are useful for object detection, for example, to provide automated or semi-automated control over one or more aspects of operation of the vehicle 22. For example, the sensors 20 may be useful for adaptive cruise control, autonomous vehicle driving, or driver assistance features.

In the illustrated example, the sensors 20 operate based on known radio and detection ranging (RADAR) signaling techniques. Each sensor 20 includes a transmitter 24 that transmits radiation or RADAR signals away from the sensor 20. Each sensor 20 includes a receiver 26 that receives RADAR signals that reflect off of objects in a field of view of the sensor 20. A radome or cover 28 provides protection from the environment for the sensor components including the transmitter 24 and receiver 26. A processor 30 controls operation of the transmitter 24 and processes signals received by the receiver 26 for purposes of performing object detection or identification in a generally known manner.

One feature of the cover or radome 28 is that it includes at least one surface at a selected angle relative to the receiver 26 to mitigate coupling between the transmitter 24 and receiver 26, which may otherwise occur when some of the radiation emitted by the transmitter 24 reflects off of the surface of the radome 28 and travels back toward the receiver 26. The angle of the surface of the radome 28 is selected to direct such reflected radiation toward at least one null of the receiver 26 where the reflected radiation is effectively attenuated to minimize or at least reduce any negative impact of such a reflection on the ability of the receiver 26 to detect radiation reflected off of target objects nearby or in a pathway of the vehicle 22.

The at least one null is a part of the receiver pattern of the receiver 26 where the received signal strength is a local minimum. As known, nulls occur in antenna patterns because different parts of an antenna radiate or receive radiation of different phases. Where those phases are opposite they effectively cancel and little or no radiation is received along the direction toward the null.

Figure 2:
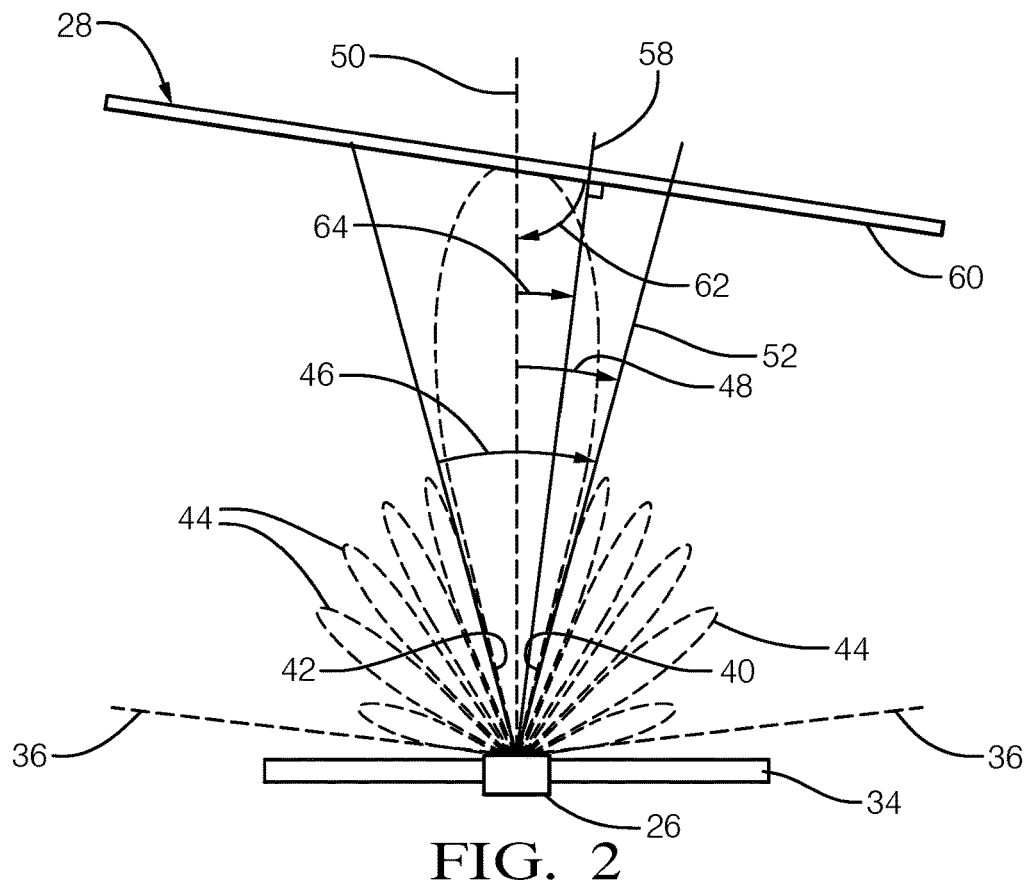
FIG. 2 schematically illustrates selected features of an example sensor.
Figure 3:
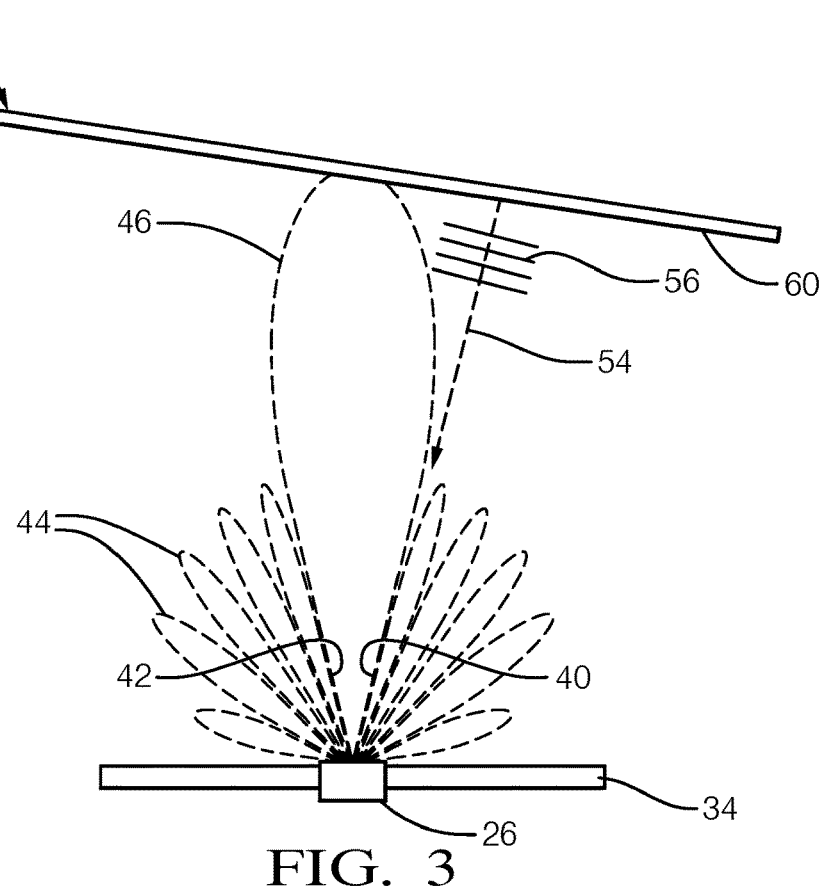
FIG. 3 is an illustration similar to FIG. 2 schematically illustrating another feature of that embodiment.

FIGS. 2 and 3 schematically illustrate selected features of a sensor 20. The receiver 26 is situated or supported on a substrate or base 34. In some examples, the substrate 34 is part of a printed circuit board of the sensor 20. The receiver 26 has a field of view schematically represented by the lines 36. A main lobe 38 of a receiver pattern is centered within the field of view of the receiver 26. The at least one null of the receiver 26 in this example embodiment includes a first null 40 situated on one side of the main lobe 38 and a second null 42 situated on an opposite side of the main lobe 38. The receiver pattern also includes side lobes 44 with nulls between them.

The first null 40 and the second null 42 have an angular separation represented at 46. The angular separation 46 is based upon characteristics of the main lobe 38. For example, the angular separation 46 may be in a range from 20° to 40°. An angle shown at 48 between a center reference line 50 of the main lobe 38 and an angular separation edge reference line 52 is equal to one-half of the angular separation 46.

The radome 28 includes at least one surface 60 facing toward the receiver 26 (and the transmitter 24, which is not illustrated in FIG. 2). The surface 60 is situated at an angle relative to the receiver 26 so that, as shown in FIG. 3, any radiation emitted by the transmitter 24 and reflected by the surface 60 toward the receiver 26 travels along a direction represented by another reference line 54 toward the first null 40 of the receiver 26. By directing the reflected radiation represented at 56 along the line 54 toward the null 40, the example arrangement effectively attenuates the reflected radiation shown at 56 to minimize any negative impact that reflection otherwise would have on the ability of the receiver 26 to detect radiation reflected from target objects.

As shown in FIG. 2, the angle at which the surface 60 is situated relative to the receiver 26 may be considered an angle with respect to a reference line, such as the center reference line 50 of the main lobe 38. Such an angle is shown at 62 in FIG. 2. In the illustrated example, the surface 60 is at a right angle to the reference line 58. The reference line 54 is at an angle 64 relative to the center reference line 50. The angle 64 in this example is equal to one-quarter of the angular separation 46. The angle 62 is a complementary angle to the angle 64 because the sum of the angles 62 and 64 equals 90° in this example. Since the angle 64 is one-quarter of the angular separation 46 and there is a pre-selected relationship between the angle 62 and the angle 64, the angle 62 may be determined based upon a relationship with the angular separation 46. In this example, that relationship is a complementary one and a sum of one-quarter of the angular separation 46 plus the angle 62 equals 90°.

The angle at which the surface 60 is situated relative to the receiver 26 may be determined using the center reference line 50 of the main lobe or a surface of the base 34. The selection of a reference line may vary depending on the embodiment and those skilled in the art that have the benefit of this description will be able to select an appropriate reference for their particular implementation.

One feature of the illustrated example is that the first null 40 and second null 42 are immediately adjacent and on opposite sides of the main lobe 38. Given that the main lobe 38 corresponds to the maximum sensitivity of the receiver 26, the first null 40 and second null 42 have the greatest ability to attenuate the radiation reflected from the surface 60 back toward the receiver 26.

Given the particulars of a receiver pattern, those skilled in the art who have the benefit of this description will be able to select an appropriate angle for the surface 60 of a radome to achieve a desired amount of attenuation of radiation transmitted by the transmitter 24 and reflected off the surface 60 back toward the receiver 26. In some embodiments, at least some of such reflected radiation is directed toward at least one null of the receiver 26. In some embodiments, a majority of such reflected radiation is directed toward a null of the receiver 26. Depending on the transmitted signal characteristics and the material of the radome 28, some embodiments include directing all of the radiation reflected off the surface 60 toward a null of the receiver 26.

Figure 4:
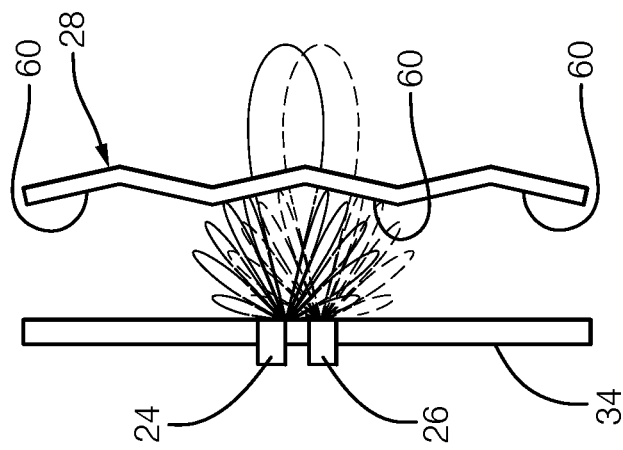
FIG. 4 schematically illustrates selected portions of a sensor including a multi-surface radome configuration.

RADAR sensors for automotive vehicles typically need to fit within tight packaging constraints. Introducing a surface 60 at an angle relative to the receiver 26 may tend to increase the space required for the sensor 20. Since the surface 60 is at an oblique angle relative to the base 34 upon which the receiver 26 is supported, a portion of the radome 28 will be further away from the base 34 compared to a radome that is parallel to such a base, for example. FIG. 4 illustrates an example arrangement for including a surface 60 at an angle relative to the receiver 26 while maintaining a small sensor envelope. In this example, two surfaces 60 are situated at two angles relative to the receiver 26. Each of the surfaces 60 is at an angle that directs radiation reflected from that surface toward at least one null of the receiver 26.

As can be appreciated from the illustration, the respective angles of the surfaces 60 relative to a reference line 70 have the same magnitude with one of those angles being a negative of the other. In other words, one of the angles of one of the surfaces 60 has a magnitude in a first direction from the reference line 70 and the other angle has the same magnitude but in an opposite direction from the reference line 70.

Figure 5:
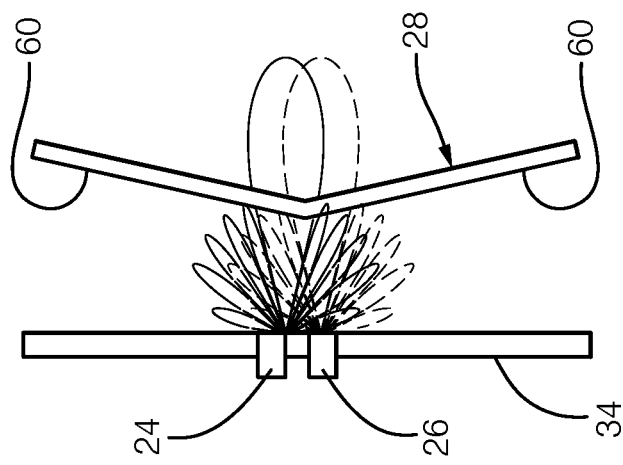
FIG. 5 schematically illustrates another multi-surface radome configuration.

FIG. 5 illustrates an arrangement in which the surfaces 60 are inverted compared to the position or angle of the surfaces 60 in the embodiment of FIG. 4.

Figure 6:
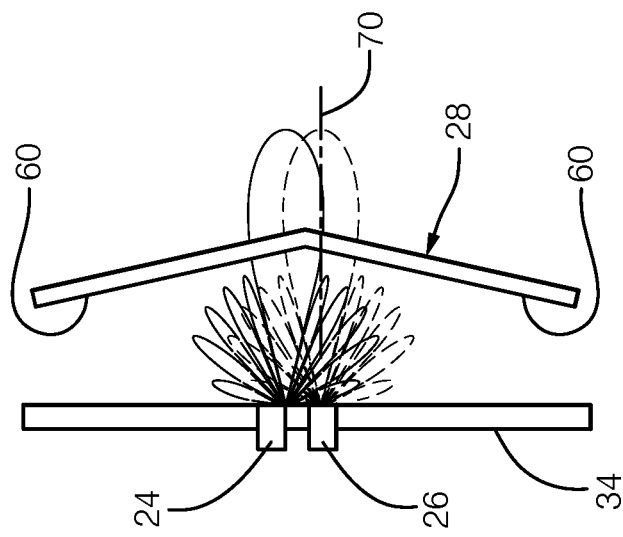
FIG. 6 illustrates another example embodiment of a multi-surface radome configuration.

FIG. 6 illustrates another example radome configuration including a plurality of alternately oriented surfaces 60. Each of the surfaces 60 in this example is situated at an angle that results in radiation reflecting off the surface 60 being directed toward at least one null of the receiver 26.

Sensors including a radome with a surface 60 arranged at a preselected angle relative to the receiver 26 mitigate or minimize coupling between the transmitter 24 and receiver 26. Directing radiation reflected from the surface 60 of the radome 28 toward a null of the receiver 26 effectively reduces or eliminates any negative impact such reflected radiation would otherwise have on the operation of the receiver 26 and the sensor 20.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A sensor device, comprising
   a transmitter;
   a receiver having at least one lobe and at least one null; and
   a cover near the transmitter and the receiver, the cover including a surface facing toward the transmitter and the receiver, the surface being at an angle relative to the receiver to direct at least some radiation transmitted by the transmitter and reflected from the surface toward the at least one null,
   wherein
   the receiver has a field of view,
   the at least one lobe includes a main lobe near a center of the field of view,
   the at least one null includes a first null on one side of the main lobe and a second null on another side of the main lobe,
   there is an angular separation between the first null and the second null,
   the angle of the surface has a preselected relationship to the angular separation, and
   a sum of the angle of the surface plus one-quarter the angular separation equals 90°.

2. The sensor device of claim 1, wherein the angle of the surface directs a majority of the radiation reflected from the surface toward the at least one null.

3. The sensor device of claim 2, wherein the angle of the surface directs all of the radiation reflected from the surface toward the at least one null.

4. The sensor device of claim 1, comprising a base and wherein
   the transmitter is supported on the base;
   the receiver is supported on the base; and
   the angle of the surface is an oblique angle relative to the base.

5. The sensor device of claim 1, wherein
   the receiver comprises an antenna; and
   the radiation comprises a radio detection and ranging (RADAR) signal.

6. An automobile vehicle comprising the sensor of claim 1.

7. The sensor device of claim 1, wherein
   the receiver means has a field of view;
   the at least one lobe includes a main lobe near a center of the field of view;
   the at least one null includes a first null on side of the main lobe and a second null on another side of the main lobe;
   there is an angular separation between the first null and the second null; and
   the angle of the surface has a preselected relationship to the angular separation.

8. A sensor device, comprising
   a transmitter;
   a receiver having at least one lobe and at least one null; and
   a cover near the transmitter and the receiver, the cover including a surface facing toward the transmitter and the receiver, the surface being at an angle relative to the receiver to direct at least some radiation transmitted by the transmitter and reflected from the surface toward the at least one null, wherein
the surface comprises a plurality of surfaces;
the angle comprises a plurality of angles; and
the surfaces are at respective ones of the angles.

9. The sensor device of claim 8, wherein
a first one of the angles is a positive angle of a selected magnitude;
the angle of a first one of the surfaces is the first one of the angles;
a second one of the angles is a negative angle of the selected magnitude; and
the angle of a second one of the surfaces is the second one of the angles.

10. The sensor device of claim 8, wherein
the receiver comprises an antenna;
the antenna has a receiver pattern including an angular separation between nulls that are respectively on opposite sides of a main lobe;
the at least one lobe of the receiver corresponds to the main lobe;
the at least one null of the receiver comprises nulls on opposite sides of the at least one lobe of the receiver;
the nulls on opposite sides of the at least one lobe of the receiver are separated by the angular separation; and
the angle of at least one of the surfaces is based on the angular separation.

11. A method of controlling transmission and reception coupling in a sensor device that includes a transmitter, a receiver and a cover near the transmitter and the receiver, wherein the receiver has at least one lobe and at least one null, the method comprising:
transmitting radiation from the transmitter; and
directing at least some of the radiation that reflects off a surface of the cover toward the at least one null based on an angle of the surface relative to the receiver wherein
the receiver has a field of view;
the at least one lobe includes a main lobe near a center of the field of view;
the at least one null includes a first null on side of the main lobe and a second null on another side of the main lobe;
there is an angular separation between the first null and the second null;
the angle of the surface has a preselected relationship to the angular separation; and
a sum of the angle of the surface plus one-quarter the angular separation equals 90°.

12. The method of claim 11, wherein the angle of the surface directs a majority of the radiation reflected from the surface toward the at least one null.

13. The method of claim 12, wherein the angle of the surface directs all of the radiation reflected from the surface toward the at least one null.

14. The method of claim 11, wherein
the receiver comprises an antenna; and
the radiation comprises a radio detection and ranging (RADAR) signal.

15. A sensor device, comprising
transmitter means for transmitting radiation;
receiver means for receiving radiation, the receiver means having at least one lobe and at least one null; and
cover means for covering the transmitter and the receiver, the cover means including a plurality of surfaces facing toward the transmitter and the receiver, each of the surfaces being at a respective one of a plurality of angles relative to the receiver to direct at least some radiation transmitted by the transmitter and reflected from the surface toward the at least one null.

* * * * *